United States Patent [19]

Theobald et al.

[11] Patent Number: 5,157,564
[45] Date of Patent: Oct. 20, 1992

[54] STORAGE MODULE CHANGER FOR A COMPUTER DATA STORAGE DRIVE

[75] Inventors: William L. Theobald, Newport Beach, Calif.; Barry C. Kockler, Lewisville, Tex.

[73] Assignee: Archive Corporation

[21] Appl. No.: 531,993

[22] Filed: May 31, 1990

[51] Int. Cl.⁵ .............................. G11B 15/68
[52] U.S. Cl. ...................................... 360/92
[58] Field of Search .................. 360/92, 91, 71

[56] References Cited
U.S. PATENT DOCUMENTS

| | | | |
|---|---|---|---|
| 3,453,397 | 7/1969 | Miller et al. | 360/92 |
| 4,668,150 | 5/1987 | Blumberg | 360/92 X |
| 4,772,968 | 9/1988 | Nonaka et al. | 360/92 |
| 4,802,035 | 1/1989 | Ohtsuka | 360/92 |
| 4,918,548 | 4/1990 | O'Donnell et al. | 360/92 |

*Primary Examiner*—John H. Wolff
*Attorney, Agent, or Firm*—Eugene H. Valet

[57] ABSTRACT

A changer method and apparatus for the loading and unloading of data storage modules from a module drive, such as a computer back-up tape drive, is described. To load the drive, the changer pulls a data storage module, such as a DAT cassette, from a magazine by its end, or face, farthest from the drive. To unload a module from the drive, the changer pushes the module by its end or face found furthest in the interior of the drive's module operative station.

7 Claims, 3 Drawing Sheets

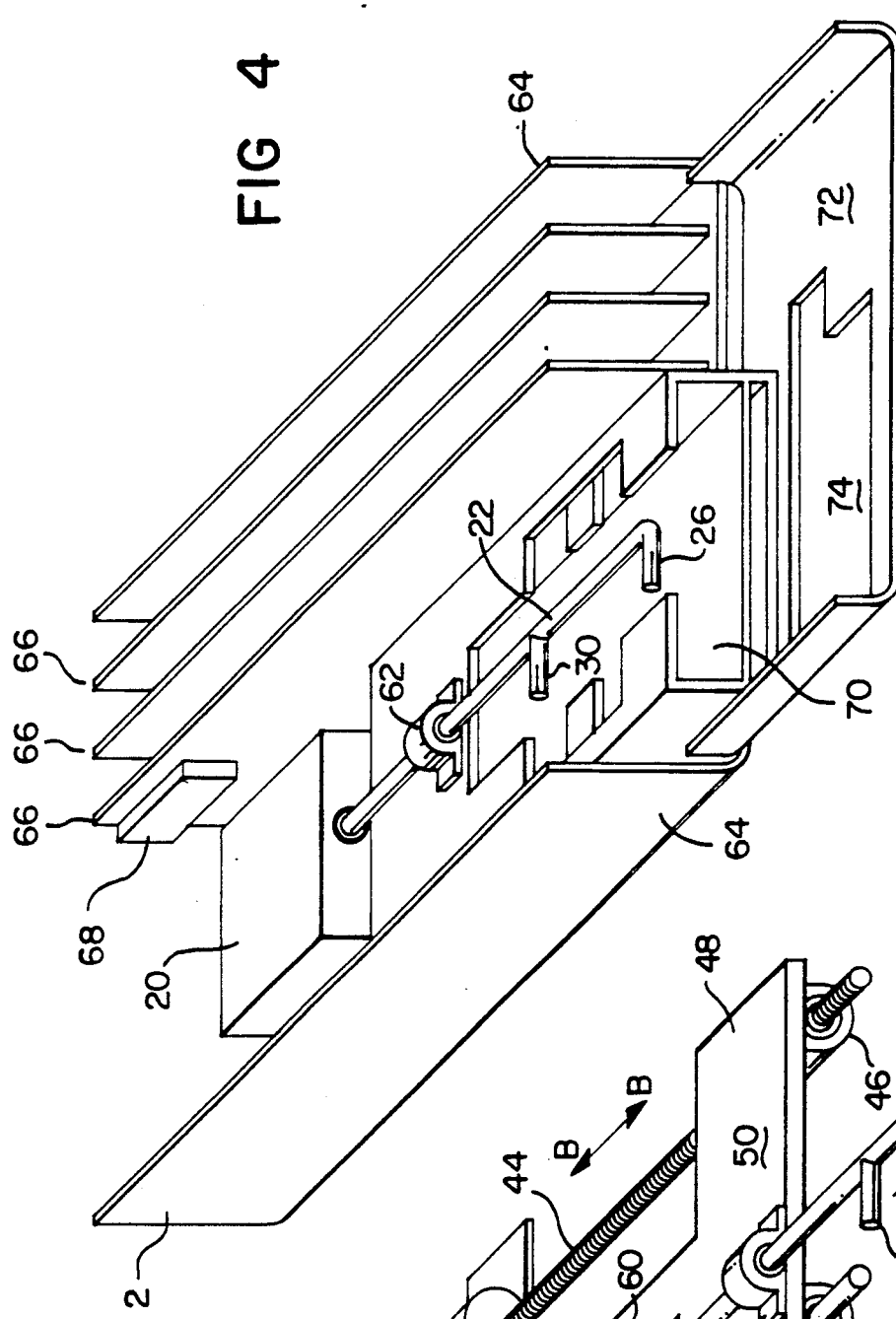

STORAGE MODULE CHANGER FOR A COMPUTER DATA STORAGE DRIVE

BACKGROUND OF THE INVENTION

1. Field of the Invention

The present invention relates generally to digital information and data storage and, more specifically, to systems and devices for changing portable data storage modules, described in an exemplary embodiment for magnetic tape storage devices for computer applications.

2. Description of the Related Art

From the start, digital computers have required some form of data storage as an adjunct to their relatively sparse main memory facilities (typically random access memory (RAM) integrated circuits).

Most personal computers use a "hard disk," sometimes referred to as a Winchester disk, for on-line storage of many millions of bytes of software programs and user created data.

It is well-known that flexible disks and disk drive systems provide a common system for backing up the hard disk in case of a catastrophic failure making access impossible or fruitless. Other examples of such storage methods include optical disks, changeable hard disks (known as "Bernoulli disks"), and magnetic tape drives, using standard cassettes, computer cartridges such as the popular 3M ANSI-standard DC600 cartridge and DC2000 mini-cartridge ("3M" is a trademark of Minnesota Mining and Manufacturing Company). Each of these medium lend themselves to loading into multi-unit magazines.

Magnetic tape devices have come to the forefront as fast, efficient, economical means for storing computer data, such as for backing-up hard disk software application programs and user data created using the programs or for off-line file management tasks routinely implemented between a disk and tape as the data is processed. These devices are available for storing data in capacity ranges that match the requirements of small to medium computer systems. For example, commercially available devices can magnetically store up to 320 megabytes of digital data on quarter-inch tape cartridges. A detailed description of well known computer tape drive technology can be found in *STREAMING*, Copyright 1982, Archive Corporation, Library of Congress Catalog No. 82-072125.

These various types of digital data storage media are referred to generically as "data storage modules" hereinafter. The apparatus for using such a module will be referred to generically as a "drive" regardless of the media for which it is adapted. While this application will focus on computer back-up tape cartridges as a prime exemplary embodiment, it will be obvious to a person skilled in the art that the present invention is applicable to all other data storage modules adaptable to multi-module magazine loading, including modules used for non-computer data, such as audio CD's and CD-ROMS.

As computer hard disk memories grow, as the size of the stored information expands (e.g., technical drawings use vast amounts of memory), or as personal computers become "networked," the need for a fast, reliable means for storing vast amounts of data generally exceeds the capacity of a single data storage module. Hence, there is a need for changing data storage modules in order to increase the peripheral storage capacity of the computer or computer network. Preferably, such loaders, or data storage module changers, are designed to operate without human manipulation of the module.

A typical cartridge loader of the prior art is shown in U.S. Pat. No. 4,918,548 (O'Donnell et al.). A large and complex mechanism for pushing a cartridge into a drive or gripping and pulling a cartridge out of the drive is shown.

Co-pending applications of the common assignee of the present invention, U.S. Ser. Nos. 07/434,036 (filed Nov. 9, 1989) and its continuation-in-part 07/510,548 (filed Apr. 18, 1990), disclose a compact system which can be affixed directly to a drive in a personal computer meeting industry standard "form factors" (also called "5 ¼ inch" or "3 ½ inch drives"). Said applications further disclose a means for selectively registering modules in a magazine with the module loading aperture of a drive. Said applications are incorporated herein by reference.

There is a need for a cartridge loader/changer which reduces the complexity of known systems and provides increased reliability.

SUMMARY OF THE INVENTION

An advantage of the present invention is its simplicity of design and operation.

It is another advantage of the present invention is its relatively compact size.

In its basic aspects, the present invention includes a data storage module changing method of placing a multi-module magazine into an aligned adjacent configuration with a data storage drive having a first module within a module operative station in the operative; unloading the first module from the drive station by pushing the module from the operative station through a drive loading aperture by its proximal face into an empty receptacle of the magazine; shifting the magazine to a position such that a second module loaded receptacle is aligned with the drive loading aperture station; and loading the second module from the magazine by pulling the module by its distal face from the receptacle through the drive loading aperture into the drive.

In a basic configuration, the apparatus of the present invention includes a data storage module changer adapted for use such as with a computer peripheral data storage device having a aperture for receiving a module into a operative station in said device where a computer can communicate information to and from said module, said device being adapted to for use with a module magazine. The changer comprises a piston rod, having at least one hooking means at its distal end for pulling a module into said drive station from said magazine and at least one finger means located on said rod for pushing said module from said drive station into said magazine from said station. A driver device connected to said piston rod provides movement to said piston rod such that said piston rod hook pulls a module from said magazine by its distal face into said station or said finger pushes a module by its proximal face from said station of said drive into said magazine.

Other objects, features and advantages of the present invention will become apparent upon consideration of the following detailed description and the accompanying drawings, in which like reference designations represent like features throughout the FIGURES.

BRIEF DESCRIPTION OF THE DRAWINGS

FIG. 3 is a perspective view, detail drawing of a preferred embodiment of the module changer of the present invention.

FIG. 4 is a perspective view, cutaway drawing of the present invention configured as a system with a magnetic tape drive.

The drawings referred to in this description should be understood as not being drawn to scale except if specifically noted. Dimensions shown in inches in some of the FIGURES are provided merely to indicate perspective rather than to limit the scope of the invention in any manner.

DETAILED DESCRIPTION OF THE INVENTION

Reference is made now in detail to specific embodiments of the present invention, which illustrate the best modes presently contemplated by the inventor(s) for practicing the invention. Alternative embodiments are also briefly described as applicable.

Figure 1:
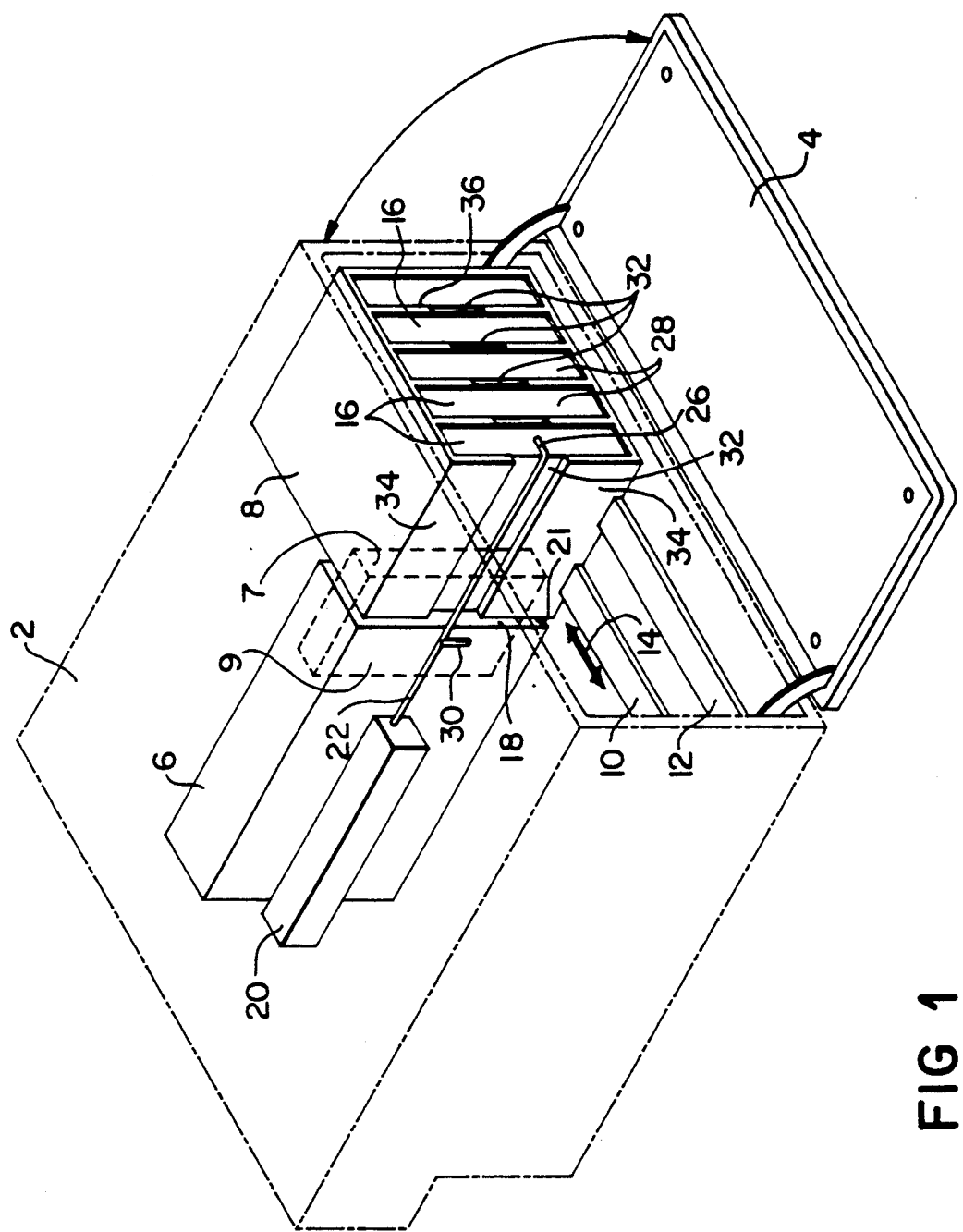
FIG. 1 is a perspective view, schematic drawing of the present invention in a module drive system configuration embodiment.

Referring to FIG. 1, a first embodiment of the data storage module system, a housing 2 provides a basic platform for the system of the present invention. An optional, hinged door 4 can be provided for dust and wear protection or aesthetic purposes.

A data storage module drive 6 is mounted in housing 2.

A data storage module magazine 8 rides on rails 10, 12 in a translational relationship to drive 6 in the manner as indicated by arrow 14 in order to selectively align a module, in this embodiment a Digital Audio Tape (DAT) 16 in a receptacle chamber said magazine 8 with a loading aperture (not shown) in one end 18 of the drive 6. The magazine 8 is provided with multiple modules 16 as is well known in the art and not requiring further explanation for the purposes of understanding the present invention.

Figure 2:
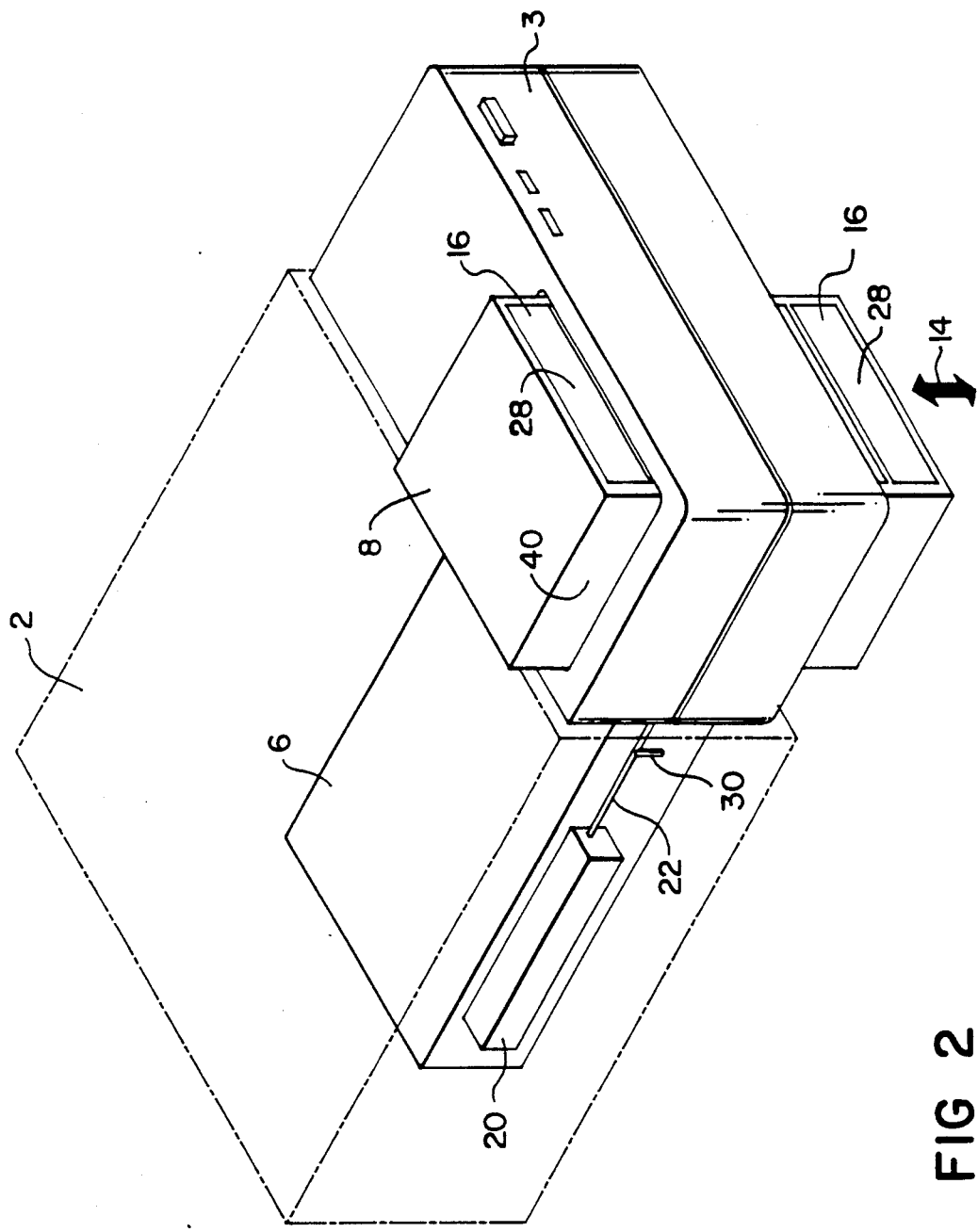
FIG. 2 is a perspective view, schematic drawing of a second embodiment of the present invention showing an alternative arrangement with a module drive system.

Referring briefly to FIGS. 2 and 4, alternative embodiments demonstrate that a variety of system arrangements and orientations is available to a person skilled in the art.

Referring back to FIG. 1, the apparatus for changing a DAT cartridge is shown generally. A driver device 20, to be described in detail below, is provided for imparting translational and rotational movement to a piston rod 22.

At a distal end 24 (with respect to the driver device 20) of the rod 22, the rod is provided with a hook 26. When the piston rod 22 is in its extended position as shown in FIG. 1, the hook 26 reaches slightly beyond the end face 28 of a DAT cartridge 16 loaded in the magazine 8.

Further, piston rod 22 also includes at least one finger member 30. Finger member 30 is situated on said rod at a position which is proximal to driver device 20 when the rod is retracted into the driver device 20. As shown in FIG. 1, when the rod 26 is in its extended position, the finger member 30 is both inboard of the face of the cartridge 16 which is adjacent to the aperture 7 (phantom lines) of the drive 6 through which it is to be loaded into its operative station 9 (phantom lines) within the drive 6 and outboard of the face 18 of the drive 6 having loading aperture 7. In other words, the finger member 30 is located to be selectively positioned in an interstitial space between the magazine 8 and the drive face 18 when the piston rod 22 is extended. This permits rotation of piston rod 22 without interference. The respective planar orientation of the hook 26 to finger 30 is dependent upon the configuration of the magazine 8 to drive 6 aperture 7.

Magazine 8 is provided with slots 32 in the end wall 34 and in the intercartridge receptacle walls 36. Said slots 32 allow the selective translational and rotation motions of piston rod 22.

Referring briefly to FIG. 2, were the magazine 8 in a position in an externally mounted magazine driver apparatus 3 where one of the central DAT cartridge receptacles were aligned with the aperture of the drive 6, the piston rod 6 would similarly move translationally through a slot 32 provided in the inner side wall 40 of the magazine 8 between adjacent cartridge 16 to load, unload or change from one cartridge 16 to another.

Referring to FIG. 3, a more detailed schematic drawing of a preferred embodiment of the driver device 20 is shown.

A motor 42, such as a DC brush motor, is used to drive a lead screw 44. Mounted on said lead screw 44 by an anti-backlash nut 46 is a carriage platform 48 on which is mounted the piston rod 22. This carriage 48 is further supported by a carriage rod 45 to which it is held by another bushing or, preferably to facilitate translational motion, a linear bearing 47. The platform 48 is configured such that translational movement of the platform 48 (as indicated by arrow B—B) by turning of the lead screw 44 by the motor 42 does not cause interference between the platform 48 and the motor 42. Mounted on the platform top surface 50 are two bushings 52, 54, which hold the piston rod 22 in a fixed configuration.

In order to impart the rotational movement to the piston rod 22 in this embodiment, a second DC brush motor 56 is suitably mounted on the platform bottom face (not shown). This second motor 56 is used to drive a worm 58 and gear 60 connected to the piston rod 22.

Thus, with the configuration of driver device 20 shown in FIG. 3, both translational and rotational movement of piston rod 22 for pulling a DAT cartridge into a drive 6 as indicated by arrow C or pushing a DAT cartridge out of a drive 6 as indicated by arrow A can be provided.

As shown in FIG. 4 and as will be recognized by a person skilled in the art, this embodiment of a fixed push rod on a translational platform could be replaced by a moving piston rod, sliding in a fixed bushing, or linear bearing 62. In this schematic, the drive 6 aperture 70 with piston rod 22 in a retracted operative position is shown.

Within the housing walls 64, printed circuit boards 66 can be mounted. All of the control electronics necessary to work the system can be incorporated on such printed circuit boards 66. If an external power supply, such as that belonging to a computer for which this sytem is used as a peripheral is used, a power connector 68 can be provided.

The cutaway section, bottom plate 72 of magazine driver apparatus 3 (taken from the system configuration of FIG. 2) has an aperture 74 through which the magazine 8 can be selectively moved to a position where a DAT cartridge 16 is in alignment with the aperture 70 of a drive 6. Piston rod 22 can then be extended from its FIG. 4 shown position into the magazine 8 through one of the slots 32. The rod 22 is rotated such that hook 26 at the distal end of piston rod 22 can engage cartridge face distal 28. The cartridge 16 is pulled through aperture 70 by the hook 26 of rod 22 into the drive interior operative station where the computer or other interface device (such as a DAT audio player) can communicate to the media, and the piston rod 22 rotated such that hook 26 and finger 30 are back in the shown non-interfering position until a message is sent to unload the drive.

To unload a cartridge 16 from the drive interior operative station, driver device 20 rotates the piston rod 22 back into an engaging position with the cartridge 16. As rod 22 is extended by driver 20, finger 30 will push the end of the cartridge farthest within the station, proximal face 21 as the driver device 20 imparts translational movement to piston rod 22, thus unloading the driver 6.

Thereafter, piston rod 22 can be rotated and retracted so that the magazine driver can move the next cartridge desired by the computer into alignment with aperture 70.

The foregoing description of the preferred embodiments of th present invention has been presented for purposes of illustration and description. It is not intended to be exhaustive or to limit the invention to the precise form disclosed. Obviously, many modifications and variations will be apparent to practitioners skilled in this art. Similarly, any process steps described might be interchageable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A method for loading a computer data storage module from a multi-module holder into a module drive mechanism, having a data storage module loading aperture and a module operative station adapted for a computer to communicate information to and from said data storage module, after selectively placing a module within said multi-module holder into adjacent configuration with said data storage module loading aperture for reception of a module by said drive, comprising:
    extracting a data storage module from said multi-module holder by pulling said module by a distal end face directly from said multi-module holder through said data storage module loading aperture and directly into said module operative station of said drive.

2. A method for unloading a computer data storage module that is loaded in a module drive mechanism, having a data storage module loading aperture and a module operative station where a computer can communicate information to and from said loaded module, into a multi-receptacle data storage module holder, after placing said multi-receptacle data storage module holder into adjacent configuration with said data storage module loading aperture for reception from said drive of a data storage module loaded in said module operative station, comprising:
    expelling said loaded data storage module from said module operative station of said drive by pushing said module by a proximal face from said module operative station through said data storage module loading aperture and directly into an empty receptacle of said multi-receptacle data storage module holder.

3. A data storage module changing system for a data storage drive having an aperture for receiving a module into a module operative station of said data storage drive, and a data storage module magazine, having spaces between adjacent data storage modules in said magazine, adjoining said aperture, for holding a plurality of said modules in selective registration with said aperture, comprising:
    engaging means for selectively engaging the proximal and distal ends of said modules in relation to said module operative station of said drive;
    driver means, connected to said engaging means, for providing movement to said engaging means such that said engaging means can selectively reach through said aperture of said drive and said spaces in said magazine and pull a module from said magazine by a distal end directly into said module operative station or push a module by a proximal end from said module operative station of said drive directly into said magazine.

4. The system as set forth in claim 3, wherein said engaging means further comprises:
    a piston rod, having a hooking means at an end distal from said moving means for pulling a module into said module operative station and a finger means proximal said driver means when said rod is in a retracted position for pushing a module from said module operative station into said magazine.

5. The system as set forth in claim 4, wherein said driver means further comprises;
    translating means for providing selective translational movement to said rod from a retracted position when said module is in said module operative station to an extended position through said magazine spaces when said module is in said magazine; and
    rotating means for providing selective rotational movement to said rod for turning said hook or said finger into an engaging position with a module distal end or proximal end, respectively, when pulling a module or pushing a module, respectively, and for disengaging said rod from a module.

6. In a data storage module system, having a module drive having an aperture for receiving a module into an interior module operative station within said drive where a computer communicates information to and from said module, an improved data storage module changer for a plurality of modules loaded in a magazine apparatus located adjacent said aperture for selectively holding one of said modules in registration with said aperture, said improvement characterized by:
    a piston rod;
    at least one hook means on one end of said piston rod for pulling a module directly into said module operative station from said magazine;
    driving means, coupled to a second end of said piston rod distal from said one end, for providing selective translational movement to said rod from a retracted position when a module is in said drive station to an extended position through said magazine spaces when said module is in said magazine;

finger means on said piston rod adjacent said driving means when said piston rod is in said retracted position for pushing said module from said drive station into said magazine; and rotating means for providing selective rotational movement to said rod for turning said hook or said finger into an engaging position with said module distal end or proximal end, respectively, when pulling said module or pushing said module, respectively, directly between said module operative station and said magazine, and for disengaging said hook means and finger means from said module.

7. A tape cartridge changer adapted for use with a computer peripheral tape drive device having an aperture for receiving a tape cartridge into an operative station in said device where a computer can communicate information to and from said tape cartridge, said device being adapted for use with a tape cartridge magazine having spaces between cartridges loaded therein, said changer comprising:

a piston rod, having at least one hook at its distal end adapted to pull a tape cartridge directly from said magazine into said operative station and at least one finger protruding from a location on said piston rod such that said tape cartridge fits between said hook and said finger;

a piston rod driver device means, connected to said piston rod, for providing selective translational movement to said piston rod through said aperture and magazine spaces such that said piston rod hook selectively pulls a tape cartridge from said magazine by a distal face into said station or said finger pushes a tape cartridge by a proximal face from said station of said drive into said magazine; and a piston rod rotating means for providing selective rotational movement to said piston rod for turning said hook or said finger into an engaging position with said tape cartridge distal face or proximal face respectively, when pulling said module or pushing said tape cartridge, respectively, and for disengaging said rod from a module.

* * * * *